United States Patent [19]

Gnanou et al.

[11] Patent Number: 4,644,033
[45] Date of Patent: Feb. 17, 1987

[54] POLYURETHANE HYDROGELS AND PROCESS FOR THEIR MANUFACTURE

[75] Inventors: Yves Gnanou; Gérard Hild, both of Strasbourg, France

[73] Assignee: Essilor International, Creteil, France

[21] Appl. No.: 737,573

[22] Filed: May 23, 1985

Related U.S. Application Data

[63] Continuation of Ser. No. 569,757, Jan. 10, 1984, abandoned.

[30] Foreign Application Priority Data

Jan. 11, 1983 [FR] France ................................. 83 00309

[51] Int. Cl.⁴ ............................................. C08L 75/08
[52] U.S. Cl. ................................... 524/590; 525/453; 525/937
[58] Field of Search ................ 524/591, 590; 525/453, 525/937

[56] References Cited

PUBLICATIONS

Derwent Abstract, accession No. 82-10626J/51, Japanese Pat. No. J57185602-A.
Chemical Abstract, Abstract No. 129143f, vol. No. 97, Gavrilyuk et al., Lakokras. Mater. Ikn Primen., 1982.

Primary Examiner—Amelia B. Yarbrough
Attorney, Agent, or Firm—Felfe & Lynch

[57] ABSTRACT

The hydrogels consist essentially of the polyurethane of polyoxyethylene. The crosslinking is carried out by a reaction of a polyfunctional isocyanate with the polyoxyethylene in solution in a non-aqueous solvent. Transparent hydrogels are obtained, having a high swelling ratio in the presence of water and good mechanical properties.

21 Claims, No Drawings

POLYURETHANE HYDROGELS AND PROCESS FOR THEIR MANUFACTURE

This application is a continuation of application Ser. No. 569,757, filed Jan. 10, 1984.

The invention stems from research work carried out at the Centre for Macromolecular Research in Strasbourg (CNRS). It relates to the composition and the preparation of water-swellable gels, and more particularly of gels of this type, or hydrogels, which can exist in an amorphous, transparent form.

Transparent hydrogels are highly useful in ophthalmology, in the manufacture of contact lenses. This use, which is especially advantageous, is not, however, the only application of these materials.

The invention was especially concerned with the development of hydrogels combining a high degree of swelling in water with good mechanical properties, and being moreover compatible with biological tissues, so as to be capable of being employed to advantage in various medical applications, particularly in obstetrics, ophthalmology, and as an implant intended to release gradually a medication previously incorporated in the gel. The possibility of obtaining transparent hydrogels in a controlled and reproducible manner represents an additional benefit for applications such as, for example, contact lenses.

From this point of view, the invention offers polyurethane-based gels which swell in water and which are prepared using a special technique. Owing to their chemical nature, they already possess the advantages of compatibility with biological tissues and a low shrinkage in the course of manufacture, during the polymerisation of the starting components, but, in addition, the special technique which is offered makes it possible to increase the equilibrium swelling ratio of the gels in water for good mechanical properties, to combine these qualities in transparent gels, to facilitate the manufacture of these gels in the form of components of specified sizes, and to ensure good reproducibility of the shape, dimensions, transparency and in general, the structure and the properties of the products obtained.

A subject of the invention is therefore a polyurethane hydrogel characterised in that it consists essentially of a polyoxyethylene polyurethane obtained by a reaction of crosslinking with a polyfunctional isocyanate, carried out on the polyoxyethylene in solution in a non-aqueous solvent.

Another of its subjects is a process for the manufacture of hydrogels, characterised by producing the crosslinking of the polyoxyethylene with a polyisocyanate by operating in a non-aqueous solvent medium for polyoxyethylene which is substantially unreactive towards polyisocyanate.

Polyoxyethylenes are polymers of variable molecular weights, containing the repeat unit $-CH_2-CH_2O-$, and produced by the polymerisation of acetaldehyde or by the addition of a compound containing active hydrogen to ethylene oxide. They contain reactive groups, most frequently alcohol groups, which undergo condensation with isocyanate groups $-N=CO$ of the polyisocyanates, producing urethane groups $-O-CO-NH-$.

In general, the constituents involved in producing the polymeric material forming the gel can be chosen in the light of the chemist's knowledge of the reactions of polymerisation and of crosslinking with polyfunctional isocyanates in the presence of a polymer initially carrying free hydroxy groups. It is known, in particular, that the crosslinking requires that the constituents have different functionalities, one in the number of alcohol groups per molecule, the other in the number of isocyanate groups. Similarly, the isocyanate employed contains at least two $-N=CO$ groups, advantageously on an aliphatic radical containing at least 4 carbon atoms or on an aromatic radical.

In a preferred embodiment a triisocyanate, of an aliphatic or aromatic type, and a polyoxyethylene containing at least two hydroxy groups per molecule, are employed. The most common example is then the bifunctional polyoxyethylene produced by the addition of ethylene oxide to ethylene glycol. If, in an alternative form, the same polyoxyethylene is employed with a diisocyanate, then it is desirable to add to the mixture a triol as a crosslinking agent.

It should be understood, moreover, that although polyoxyethylene is a preferred base constituent for the manufacture of hydrogels according to the invention, other compounds may be added to it, particularly other polyoxyalkylenes which form copolymers with it, in a minor proportion which in general will not exceed 20% by weight.

Furthermore, the reaction mixture can include catalysts chosen according to the conventional criteria for promoting the crosslinking, and the proportion of polyisocyanate is advantageously specified relative to the quantity of base polyoxyethylene so as to be as close as possible to the stoichiometry.

According to the invention, the reaction between the polyoxyethylene and the polyisocyanate is carried out in a non-aqueous solvent medium, preferably chosen among compounds not containing amine or alcohol groups, which could react with the isocyanates. This can be, in particular, a water-miscible solvent such as dimethylformamide, methylpyrrolidone, or dioxane or a water-immiscible solvent such as ethyl acetate or dichloroethane. The operation is advantageously carried out in the total absence of water and in an inert atmosphere, in a single step.

It is clear from the above that the reaction which is carried out in a solvent medium results in a gel swollen with the solvent. It is then sufficient either to displace the solvent with water, or to evaporate the solvent to convert the gel into the dry state and then to place it in the presence of water, to obtain a hydrogel which is more or less swollen with water, suitable for the intended uses. In general, the equilibrium swelling ratio in water is essentially the same as in the solvent.

In specially preferred conditions for carrying out the invention, the polyoxyethylene has a number molecular weight of between 500 and 20,000, with a preference for average number molecular weights of between 1,000 and 10,000, and the crosslinking reaction is carried out hot, namely especially at a temperature between 40° C. and 90° C., under an inert gas. The quantity of solvent employed can vary very widely, and is generally such that the concentration of polyoxyethylene in the mixture is between 5 and 80% by weight. Satisfactory products are obtained, for example, with polyoxyethylene concentrations of the order of 20 and 50% by weight, whilst the quantity of solvent present during the preparation of the gel is very significantly less than that which the gel can contain in the equilibrium swelling state. It will often be preferable, however, for practical reasons, to operate at a constant volume and to employ exactly the quantity of solvent which is absorbed by the gel in the swollen state, under the normal use conditions, so as to produce in a mould a product which is formed directly with the desired dimensions. The POE concentration is then, for example, between 5 and 40% by weight, preferably between 7 and 20% by weight, and is fixed at a value which is determined beforehand, according to the properties of the gel prepared, depending on the nature and the proportions of the constituents.

Furthermore it has been found that it is generally beneficial to combine at least two polyoxyethylenes which differ in their molecular weights. It appears that the best products are obtained by starting from a mixture with an average molecular weight between 2,000 and 8,000, formed by two polyoxyethylenes of molecular weights respectively between 1,000 and 6,000 and between 4,000 and 10,000, preferably with a relatively small differece between the two molecular weights, for example a difference of the order of 1,000 to 5,000.

It is remarkable that the process according to the invention also makes it possible to obtain gels which are transparent, which remain transparent when the solvent impregnating them is then exchanged for water, and which are not destroyed when they are dried, whilst if the same reaction is carried out between the same constituents but in bulk, without a solent, opaque products are obtained which, in the swollen state, remain more or less opaque depending on their thickness, but too opaque for some applications.

Furthermore, the invention provides gels with good mechanical strength, which have a better capacity for water retention, with swelling ratios which can exceed 90% by weight (weight of water relative to the total weight of the swollen gel).

The invention will now be illustrated with individual examples of utilisation, which, of course, are not restricting in character. These will begin with some general data which are common to the various examples.

The crosslinked materials according to the invention are obtained in these examples from polycondensation reactions:

either between a diol, polyoxyethylene (POE) HO—(CH$_2$—CH$_2$O)$_n$—H, and triisocyanates, in particular an aliphatic triisocyanate known under the tradename Desmodur N 75, and an aromatic triisocyanate known under the tradename Desmodur L. The formulae put forward by the manufacturer for these products are as follows:

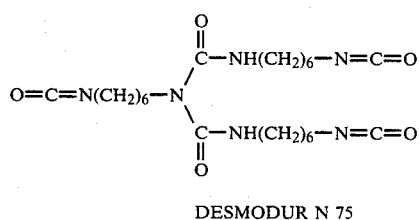

DESMODUR N 75

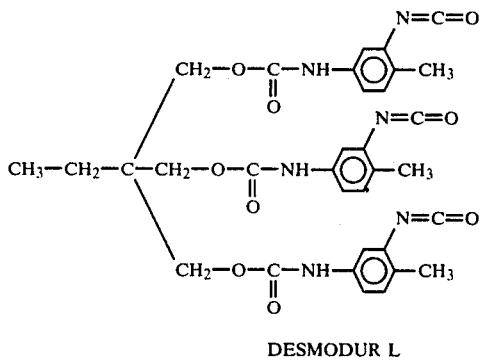

DESMODUR L or between a mixture of this diol with a triol, represented in this case, by way of example, by trimethylolpropane, and a diisocyanate, in particular hexamethylene diisocyanate (HMDI), the formulae being as follows:

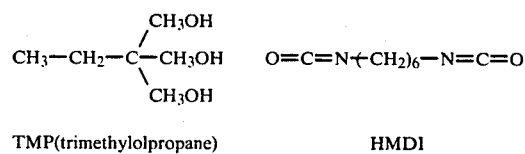

TMP(trimethylolpropane)     HMDI

Purification of the reactants

The polyoxyethylenes (POE) employed, from HOECHST, have average molecular weights ranging approximately from 1,000 to 10,000. These polymers were purified either by distillation in the case of specimens whose degree of polymerisation is less than 15, or by precipitation from their solution in benzene with a mixture of ethyl ether and petroleum ether at a low temperature, generally 10° C. The products obtained are dried in vacuo at ambient temperature to constant weights.

The triol employed, from BAYER, is trimethylolpropane. It is a solid and is purified identically to POE having an average degree of polymerisation greater than 15.

Desmodur N 75 and Desmodur L are BAYER products. Their "idealised" formulae given in the preceding paragraph suggests a functionality equal to 3.They are employed without further purification but are kept under argon in a suitable flask so that the percentage of the —N═C═O groups does not change with time.

Hexamethylene diisocyanate (HMDI) was distilled under reduced pressure (13 mm Hg) and stored under argon in a refrigerator.

The solvents employed (excluding alcohols and amino solvents) are, in particular, dimethylformamide (DMF), N-methylpyrrolidone, ethyl acetate, xylene, THF (tetrahydrofuran), and dichloroethane. These solvents are distilled twice until they become completely anhydrous. After distillation they are stored under argon.

The solvent which was used most widely is dioxan. It was placed over potassium hydroxide and then distilled over sodium wire. Starting with a solution of sodium naphthalene, the dioxan is finally distilled into a bulb fitting the reaction flask (b.p.=101° C. at normal pressure).

Assay of the reactants

Polyoxyethylene (POE) and triol

An accurate chemical assay of the terminal —OH groups was carried out in 2 stages. After reacting the alcohol with phosgene, a controlled hydrolysis of the chloroformate in the presence of methanolic KOH was carried out. The determination of the chlorine present in the form of potassium chloride is carried out by adding a solution of silver nitrate of known strength. From this, the hydroxy index, the percentage of the alcohol groups and finally the number average molecular weight $\overline{M}_n$ of the POE, and that of the TMP, are calculated. The table collates the results obtained:

| Industrial designation | Hydroxy index | OH % | $\overline{M}_n$ |
|---|---|---|---|
| POE  1000 | 111 | 3.37 | 1,010 |
| 2000 | 62 | 1.88 | 1,810 |
| 4000 | 33 | 1.00 | 3,400 |
| 6000 | 20 | 0.60 | 5,650 |
| 10000 | 13.5 | 0.41 | 8,250 |
| Trimethylolpropane M = 134 | 1,100 | 33.20 | 150 |

Desmodur N 75 and Desmodur L

The products were assayed after reaction with dibutylamine whose excess is titrated with a 0.5N solution of HCl. The percentage of —N═C═O is 16.68% for Desmodur N 75 and 10.85% for Desmodur L. These results imply that in the products employed the average functionality of the Desmodurs does not match exactly the idealised formulae referred to earlier. It would rather be about 4+05.

Operation procedure—Examples 1 to 8

The polycondensation reaction is carried out in a flash equipped with 5 ground glass joints.

The POE purified beforehand is freeze-dried directly into the reaction flask from a solution in benzene to exclude any trace of water.

The solvent (in this case dioxan), introduced by means of a bulb, is added under argon to the flask which is itself placed in a thermostated bath. The temperature is between 40° C. and 90° C., and preferably of the order of 60° C. to 80° C. The crosslinking agent is added to the reaction medium with stirring, under argon pressure, in stoichiometric quantity (that is to say that the ratio NCO/OH is equal to 1, whether a catalyst is present or not).

A sampling is then carried out in a glass tube containing a polyethylene cylinder (in order to facilitate the demoulding of the material). This tube, closed with a stopcock, to protect it from the atmosphere, is sealed under high vacuum after two successive degassings. The sealed tube is placed in a bath thermostated at the chosen temperature (generally 60° C.) for a period which is also chosen (generally 10 days).

All the handling operations carried out since the start of the process take place in complete isolation from the atmosphere. In addition, the operating procedure just described applies to the combination of the POE samples with the Desmodur N 75 and Desmodur L, as well as with the mixture consisting of HMDI and TMP.

EXAMPLE 1

Stoichiometric composition of the reaction mixture

| | |
|---|---|
| POE 10000 | 10 g |
| Desmodur N 75 | 0.61 g |
| Dioxan solvent | 40 ml |
| POE concentration | 20% |
| Temperature | 60° C. |
| No catalyst | |

EXAMPLE 2

Stoichiometric composition of the reaction mixture

| | |
|---|---|
| POE 2000 | 20 g |
| Desmodur N 75 | 5.6 g |
| Dioxan solvent | 80 ml |
| POE concentration | 20% |
| Temperature | 60° C. |
| No catalyst | |

EXAMPLE 3

Stoichiometric composition of the reaction mixture

| | |
|---|---|
| POE 10000 | 10 g |
| Desmodur N 75 | 0.61 g |
| Dioxan solvent | 10 ml |
| POE concentration | 50% by weight |
| Temperature | 60° C. |
| No catalyst | |

EXAMPLE 4

Stoichiometric composition of the reaction mixture

| | |
|---|---|
| POE 2000 | 20 g |
| Desmodur N 75 | 5.6 g |
| Dioxan solvent | 20 ml |
| POE concentration | 50% by weight |
| Temperature | 60° C. |
| No catalyst | |

EXAMPLE 5

Stoichiometric composition of the reaction mixture

| | |
|---|---|
| POE 6000 | 6 g |
| Desmodur N 75 | 0.53 g |
| Dioxan solvent | 12 ml |
| POE concentration | 33% by weight |
| Temperature | 60° C. |
| Catalyst (diazabicyclooctane or DABCO, triethylamine, stannous octoate, at a concentration of 0.1% at 60° C.) | |
| DABCO | 6 mg |

The gel point is observed earlier than when no catalyst is employed (6 h instead of 22 h).

EXAMPLE 6

Stoichiometric composition of the reaction mixture

| | |
|---|---|
| POE 6000 | 6 g |
| Desmodur N 75 | 0.53 g |
| Dioxan solvent | 12 ml |
| POE concentration | 33% by weight |

-continued

| | |
|---|---|
| Temperature | 80° C. |
| No catalyst | |

The gel point is observed earlier than when the test is carried out at 60° C. (5 h30 instead of 22 h).

EXAMPLE 7

Stoichiometric composition of the reaction mixture

| | |
|---|---|
| POE 2000 | 20 g |
| Desmodur L | 8.55 g |
| Dioxan solvent | 40 ml |
| POE concentration | 33% by weight |
| Temperature | 60° C. |
| No catalyst | |

EXAMPLE 8

Stoichiometric composition of the reaction mixture

| | |
|---|---|
| POE 2000 | 20 g |
| TMP | 1 g |
| HMDI | 3.7 g |
| Dioxan solvent | 40 ml |
| POE concentration | 33% by weight |
| Temperature | 60° C. |
| No catalyst | |

In all the preceding examples, the material obtained is transparent when it is swollen at equilibrium in dioxan. It remains transparent when the dioxan is exchanged with water.

Consequently, when machined or moulded in the appropriate shape it forms contact lenses of very good quality.

For comparison, the same compositions as in Examples 4 and 6 were employed but with the reaction being carried out in bulk without any solvent. The material which was produced in this case is opaque when swollen at equilibrium in dioxan and remains opaque when the dioxan is exchanged with water.

EXAMPLE 9

Measurements of equilibrium swelling and elasticity modulus were carried out on materials obtained according to the invention with the crosslinking being produced in a solvent medium according to the operating procedure detailed earlier. The gels were examined after their soluble fractions were extracted hot with tetrahydrofuran and the measurements were repeated after successive exchanges, in dioxan and in water.

For these exchanges, the product obtained in dioxan is left soaking in a water bath for 3 weeks. Twice or three times per week the quantity of water is increased by replacing with fresh water the preceding bath which has absorbed dioxan. The exchange of water with dioxan is carried out in a similar manner.

The retention capacity for dioxan and for water is expressed below as the concentration by weight in the swollen gel at equilibrium, for gels prepared at various concentrations of POE in the solvent and starting with POE of various average molecular weights, in every case in dioxan at 60° C.

| | Dioxan weight % | Water weight % | $E_G$ modulus in water dyne/cm$^2$ | Extractible part weight % |
|---|---|---|---|---|
| POE concentration: 20% by weight | | | | |
| POE 1000 | 85 | 80.9 | $1.58 \cdot 10^6$ | 2,11 |
| POE 2000 | 86.4 | 83.9 | $1.09 \cdot 10^6$ | 2,12 |
| POE concentration: 33% by weight | | | | |
| POE 2000 | 85.5 | 82 | $1.27 \cdot 10^6$ | 1,29 |
| POE 4000 | 91.3 | 92.2 | $2.98 \cdot 10^5$ | 1,5 |
| POE 6000 | 91 | 92.3 | $2.15 \cdot 10^5$ | 2,2 |
| POE concentration: 50% by weight | | | | |
| POE 2000 | 79 | 77 | $2.33 \cdot 10^6$ | 0,5 |
| POE 4000 | 88 | 88.6 | $6.38 \cdot 10^5$ | 1,7 |
| POE 6000 | 89 | 91 | $3.45 \cdot 10^5$ | 1,82 |

Similar results are obtained when the dioxan is replaced with another solvent, particularly dimethylformamide, N-methylpyrrolidone, tetrahydrofuran, ethyl acetate or dichloroethane.

Assuming that the solvent is, for example, dichloroethane, that is to say a water-immiscible solvent, the gel sealed with this solvent which is extracted from the tube filled at the end of reaction is first converted into the dry state by evaporating the solvent in an oven until the weight of the gel remains constant. The dry gel is then placed in the presence of water, the quantity of water in which it is immersed being gradually increased up to the state of equilibrium swelling. The gel can be cut into any suitable shape in the usual manner.

EXAMPLE 10

The same measurements as in Example 9 were carried out on gels prepared from binary mixtures of POE of various molecular weights, used in proportions such that each contributes the same number of OH groups to the mixture. The crosslinking was carried out at 60° C. in dioxan, at a concentration of 33% by weight.

The results are given below:

| POE | Average mol. weight | Dioxan weight % | Water weight % | $E_G$ (dynes/cm$^2$) modulus in water | Extractible content Weight % |
|---|---|---|---|---|---|
| 1000 and 2000 | 1,500 | 80.6 | 76.2 | $1.85 \cdot 10^6$ | 1,7 |
| 2000 and 4000 | 3,000 | 86.1 | 85 | $9.69 \cdot 10^5$ | 1,19 |
| 4000 and 6000 | 5,000 | 88.7 | 88.8 | $5.58 \cdot 10^5$ | 1,48 |
| 6000 and 10000 | 8,000 | 89.4 | 93.2 | $5.01 \cdot 10^5$ | 1,05 |
| 1000 and 4000 | 2,500 | 86.7 | 87.4 | $9.01 \cdot 10^5$ | 0,95 |
| 2000 and 6000 | 4,000 | 89.5 | 91.7 | $5.30 \cdot 10^5$ | 1,31 |

EXAMPLE 11

The same measurements, carried out on a gel prepared from the composition of Example 5, but with a reaction time restricted to 2 days, yielded the following results:

| Dioxan content | Weight % | 86.5 |
|---|---|---|
| Elasticity modulus in dioxan | $E_G$ (dynes/cm$^2$) | $1.15 \cdot 10^6$ |

At a reaction temperature of 50° C., the gel point is observed after 11 hours (instead of 6 hours at 60° C.).

For a reaction time of 4 days, the results obtained are:

| Dioxan content | Weight % | 89.5 |
|---|---|---|
| Elasticity modulus in dioxan | $E_G$ (dynes/cm$^2$) | $2.43 \cdot 10^5$ |

For gels prepared according to Example 6, namely without a catalyst but at 80° C., the following results were obtained:

| Reaction time | | 24 h | 7 days |
|---|---|---|---|
| Dioxan content | Weight % | 91.4 | 89.5 |
| Elasticity modulus in dioxan | $E_G$ (dynes/cm$^2$) | $3.0 \cdot 10^5$ | $5.84 \cdot 10^5$ |

EXAMPLE 12

The gels can be prepared by casting directly in the desired shape and sizes, for the application for which they are intended. A reaction mixture is then prepared, containing for example a concentration of 15% by weight of POE in dioxan, employing a mixture of POE with a molecular weight which is adjusted, according to preliminary experiments, to produce a gel capable of absorbing a liquid concentration of 85% of the total weight at equilibrium.

After addition of the crosslinking agent, the mixture is employed to fill the sealed moulds in which the reaction is left to proceed for 10 days at a temperature of 70° C. The gel forms absorbing all the solvent present and filling the entire volume of the moulds. After demoulding, the solvent is exchanged with water as already described.

The series of examples which are given above confirms that the process of the invention makes it possible to obtain transparent hydrogels which, at equilibrium swelling in water, contain from 30 to 99%, and preferably from 60 to 95% by weight of water, and have an elasticity modulus of the order of $10^5$ to $3.10^6$ dyne/cm$^2$. Typical gels have a water content from 70 to 97% by weight while the extractible part (which can dissolve into the swelling water) is always not more than 5% by weight, and generally not more than 3% by weight.

Naturally, however, the invention is not restricted in any fashion by the individual conditions which are detailed within the examples which have been specially described.

We claim:

1. A molded article of a polyurethane hydrogel comprising a polyoxyethylene polyurethane one step cross-linking reaction product of a polyfunctional isocyanate with a polyoxyethylene in solution in a non-aqueous solvent which is substantially non-reactive for said polyisocyanate essentially in absence of water in an inert atmosphere to yield a gel swollen by the non-aqueous solvent.

2. The molded article of claim 1, wherein the polyoxyethylene contains two alcohol groups per molecule, the polyfunctional isocyanate then being a triisocyanate.

3. The molded article of claim 1, as produced from a composition comprising a polyoxyethylene containing two alcohol groups per molecule, a diisocyanate and a cross-linking agent consisting of a triol.

4. The molded article of claim 1 wherein the hydrogel has a water content of from 30 to 99% by volume at its swelling equilibrium in water, and an elasticity modulus of the order of $10^5$ to $3.10^6$ dynes/cm$^2$.

5. The molded article of claim 4, wherein said content is from 60 to 95% by weight.

6. The molded article of claim 4, having an extractible content not more than 3% by weight in water.

7. A molded article of a transparent polyurethane hydrogel, containing from 70 to 97% by weight of water at its swelling equilibrium in water, and not more than 5% by weight extractible content and having an elasticity modulus of $10^5$ to $3.10^6$ dynes/cm$^2$.

8. A process for manufacturing a molded article of claim 1 comprising reacting, in one step, a polyfunctional isocyanate with a polyoxyethylene in solution in a non-aqueous solvent which is substantially unreactive towards the polyisocyanate, essentially in absence of water in an inert atmosphere to yield a gel swollen by the non-aqueous solvent.

9. A process for manufacturing a molded article according to claim 1, comprising reacting in one step a polyfunctional isocyanate with a polyoxyethylene in solution in a non-aqueous solvent which is substantially unreactive towards the polyisocyanate essentially in absence of water in an inert atmosphere to yield a gel swollen by the non-aqueous solvent said gel being then contacted with water, thereby achieving the swelling of the gel with water as a replacement for the solvent.

10. A process according to claim 8, wherein the polyoxyethylene has a number average molecular weight between 500 and 20,000.

11. A process according to claim 10, wherein said number average molecular weight is between 1,000 and 10,000.

12. A process according to claim 8, wherein the concentration of polyoxyethylene in the mixture dissolved in the solvent is between 5 and 80% by weight.

13. A process according to claim 8, wherein the solvent is chosen from dimethyl-formamide N-methylpyrrolidone, tetrahydrofuran, dioxan, ethyl acetate and dichloroethane.

14. A process for manufacturing a hydrogel molded article according to claim 1, comprising reacting, in one step, a polyfunctional isocyanate with a polyoxyethylene in solution in a non-aqueous solvent which is substantially unreactive towards the polyisocyanate, essentially in absence of water in an inert atmosphere, wherein the mixture is introduced into a mold to react with a quantity of solvent corresponding substantially to that which the gel formed contains in the swollen state at equilibrium, thereby yielding a gel swollen by the non-aqueous solvent.

15. Articles consisting of a polyurethane hydrogel having the characteristics of claim 1 or manufactured by the process according to claim 8.

16. Articles according to claim 15, produced in the form of contact lenses.

17. An article according to claim 15 comprising a polyurethane hydrogel containing from 70 to 97% by weight of water at its swelling equilibrium in water, and not more than 5% by weight extractable content.

18. The article of claim 17 wherein the polyurethane hydrogel is a molded hydrogel and the article is a contact lense.

19. The process of claim 8 wherein the reaction takes place in a mold.

20. A process for manufacturing a hydrogel according to claim 1 comprising reacting in a mold, in one step, a polyfunctional isocyanate with a polyoxyethylene in solution in a non-aqueous solvent which is substantially unreactive towards the polyisocyanate essentially in absence of water in an inert atmosphere, wherein the amount of solvent is substantially just that required to swell the gel formed further comprising evaporating the non-aqueous solvent and thereafter contacting the gel with water as a replacement for the solvent.

21. The molded article of claim 1, wherein the polyoxyethylene has a number average molecular weight of 500 to 20,000.

* * * * *